(12) United States Patent
Kanonakis et al.

(10) Patent No.: US 8,787,761 B2
(45) Date of Patent: Jul. 22, 2014

(54) MULTI-SERVICE PROVISIONING IN ORTHOGONAL FREQUENCY DIVISION MULTIPLEXING-PASSIVE OPTICAL NETWORK OFDMA-PON

(75) Inventors: Konstantinos Kanonakis, Athens (GR); Neda Cvijetic, Plainsboro, NJ (US); Jingjing Zhang, San Jose, CA (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 133 days.

(21) Appl. No.: 13/588,335

(22) Filed: Aug. 17, 2012

(65) Prior Publication Data

US 2013/0045012 A1  Feb. 21, 2013

Related U.S. Application Data

(60) Provisional application No. 61/524,340, filed on Aug. 17, 2011.

(51) Int. Cl.
| | |
|---|---|
| H04J 14/00 | (2006.01) |
| H04J 14/02 | (2006.01) |
| H04L 27/26 | (2006.01) |
| H04Q 11/00 | (2006.01) |

(52) U.S. Cl.
CPC ........ *H04L 27/2697* (2013.01); *H04Q 11/0067* (2013.01); *H04Q 2011/0086* (2013.01)
USPC .............................. 398/79; 398/66

(58) Field of Classification Search
CPC ........... H04L 27/2697; H04Q 11/0067; H04Q 2011/0086
USPC ............................................................ 398/79
See application file for complete search history.

(56) References Cited

U.S. PATENT DOCUMENTS

2009/0092394 A1* 4/2009 Wei et al. ..................... 398/79

OTHER PUBLICATIONS

Ahmad R. Dhaini,Pin-Han Ho, and Xiaohong Jiang,"WiMAX-VPON: A Framework of Layer-2 VPNs for Next-Generation Access Networks", Jul. 2010,J. Opt. Commun. Netw., vol. 2, No. 7,401-406.*
András Faragó,"Meta-MAC Protocols: Automatic Combination of MAC Protocols to Optimize Performance for Unknown Conditions", Sep. 2000 , IEEE Journal on Selected Areas in Communications,vol. 18, No. 9,1670-1673,1679.*
K. Christodoulopoulos, I. Tomkos, and E. A. Varvarigos,"Elastic Bandwidth Allocation in Flexible OFDM-Based Optical Networks", May 1, 2011 ,Journal of Lightwave Technology,vol. 29, No. 9,1354-1365.*
Yonghong Zhang and Cyril Leung, "Resource Allocation in an OFDM-Based Cognitive Radio System", Jul. 2009 ,IEEE Transactions on Communications,vol. 57, No. 7,1928-1929.*
Xinyu Zhang, Baochun Li, "Network Coding Aware Dynamic Subcarrier Assignment in OFDMA Wireless Networks" ,2008,IEEE Communications Society, ICC 2008 proceedings,2736-2737.*

* cited by examiner

*Primary Examiner* — David Payne
*Assistant Examiner* — Omar S Ismail
(74) *Attorney, Agent, or Firm* — Joseph Kolodka

(57) ABSTRACT

A method for multi-service provisioning in an OFDMA-PON that includes linking communicatively to a core network and bandwidth provisioning, dynamically within a single wavelength, traffic from the core network to a network of multiple virtual passive optical networks VPONs for multi-service provisioning to the VPONs.

20 Claims, 3 Drawing Sheets

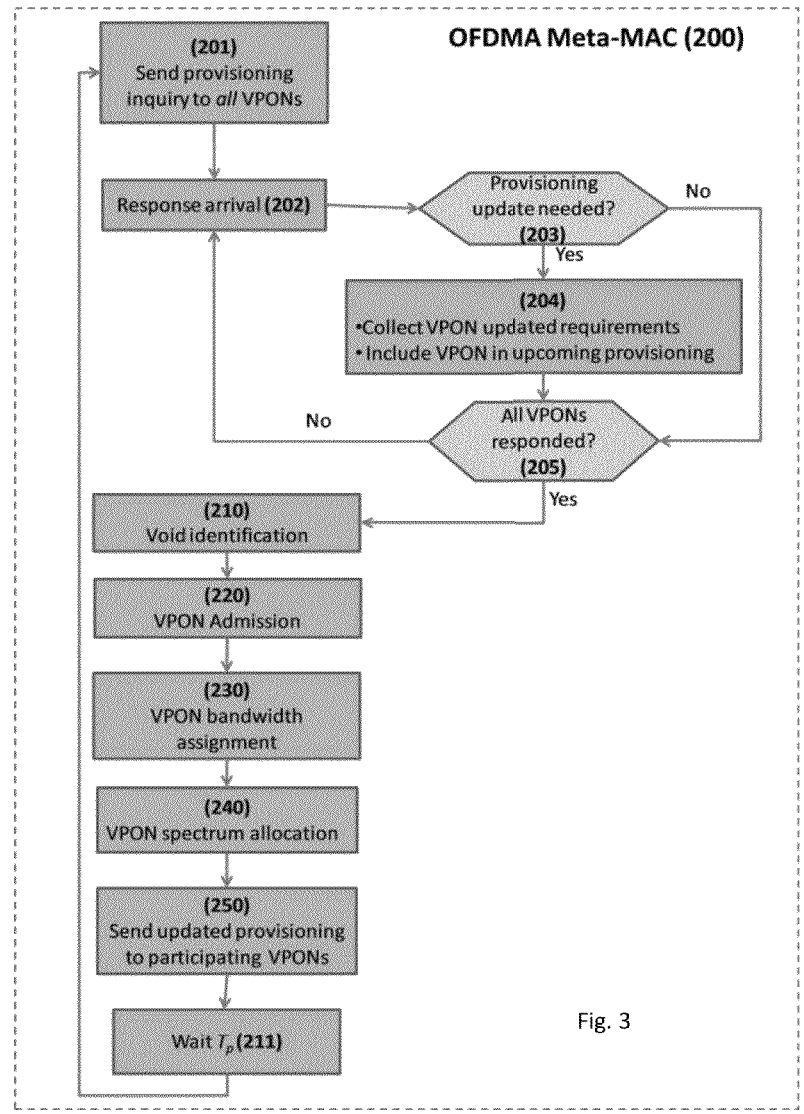
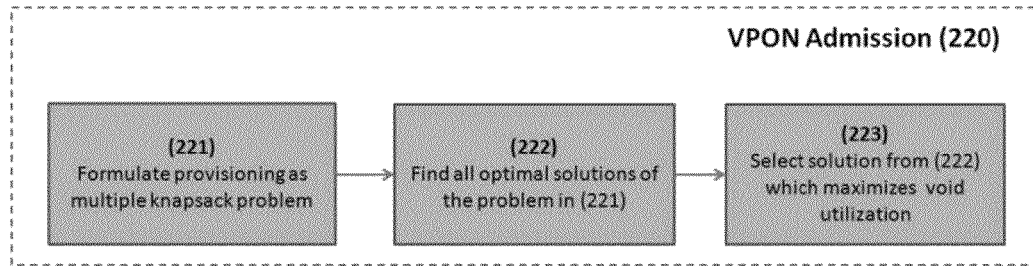
FIG. 4

MULTI-SERVICE PROVISIONING IN ORTHOGONAL FREQUENCY DIVISION MULTIPLEXING-PASSIVE OPTICAL NETWORK OFDMA-PON

RELATED APPLICATION INFORMATION

This application claims priority to provisional application No. 61/524,340 filed Aug. 17, 2011, the contents thereof are incorporated herein by reference

BACKGROUND OF THE INVENTION

The present invention relates generally to optical communications, and more particularly, to multi-service provisioning in orthogonal frequency division multiplexing-passive optical network OFDMA-PON.

The plethora of emerging service and network drivers is rapidly driving the next generation of passive optical networks (PON) beyond the standardized 10-Gigabit-capable passive optical network XG-PON and 10G Ethernet PON variants. These include time division, wavelength division, orthogonal frequency division, and code division multiple access solutions: time division multiple access TDMA, wavelength-division multiplexing WDM, orthogonal frequency division multiple access OFDMA, code division multiple access CDMA, respectively as well as hybrid options formed from the aforementioned constituent technologies.

However, while all these technologies operate on a point-to-multipoint PON topology, they often feature inherent and irreconcilable physical layer (PHY) differences. The resulting PHY divide poses both technical and practical difficulties in deploying multiple systems over a common fiber platform operated as a broadcast medium. Namely, with different PHY technologies running customized medium access control (MAC) protocols over a common wavelength channel, efficient yet fair inter-technology bandwidth allocation becomes a vital issue. Moreover, the cost-efficient mass market production of generic optical line terminal (OLT) interfaces also emerges as a challenge, since each network might need to support a different mix of heterogeneous optical network units (ONUs). Prominent examples include the co-existence of legacy and emerging PON technologies, as well as the open access environment, wherein multiple operators could deploy different technologies over a common infrastructure. In each case, a mechanism that makes optimal use of limited bandwidth resources and also bridges the PHY divide is required from both performance and cost perspectives.

Previously, a wavelength division multiplexing-passive optical network WDM-PON has been proposed to transparently deliver multiple services to a collection of ONUs, since each ONU can use a dedicated wavelength channel. However, a WDM-PON lacks the flexibility to dynamically allocate bandwidth resources among different services at increased granularity (only one wavelength can be used by each service). Therefore, a WDM overlay is appropriate only for enhancing the aggregate capacity in the access network, while other schemes are required for bandwidth allocation in the sub-wavelength domain. Sub-wavelength granularity could be achieved by using TDMA mechanisms similar to legacy PON. However, scaling up TDMA-PON beyond 10 Gb/s implies significantly increased complexity and cost for the optical components and the burst mode receivers at the OLT side.

Accordingly, there is a need for multi-service provisioning in orthogonal frequency division multiplexing-passive optical network OFDMA-PON.

BRIEF SUMMARY OF THE INVENTION

The present invention is directed to a method for multi-service provisioning in an OFDMA-PON that includes linking communicatively to a core network and bandwidth provisioning, dynamically within a single wavelength, traffic from the core network to a network of multiple virtual passive optical networks VPONs for multi-service provisioning to the VPONs. In a preferred embodiment, the bandwidth provisioning includes collecting VPON provisioning requirements and provisioning updates, performing the bandwidth provisioning for a given VPON if its real-time traffic fluctuations exceed a pre-defined threshold, setting the threshold either by an individual VPON MAC process or a meta-MAC, and for needed bandwidth provisioning, each participating VPON providing its guaranteed rate, peak rate and requested rate to the meta-MAC.

These and other advantages of the invention will be apparent to those of ordinary skill in the art by reference to the following detailed description and the accompanying drawings.

BRIEF DESCRIPTION OF THE DRAWINGS

FIG. 3 is a block diagram of OFDMA Meta-MAC (200) dynamic provisioning process, in accordance with the invention;

FIG. 4 is a detailed block diagram of the VPON admission stage (220) of the OFDMA Meta-MAC (200), in accordance with the invention.

DETAILED DESCRIPTION

Figure 1:
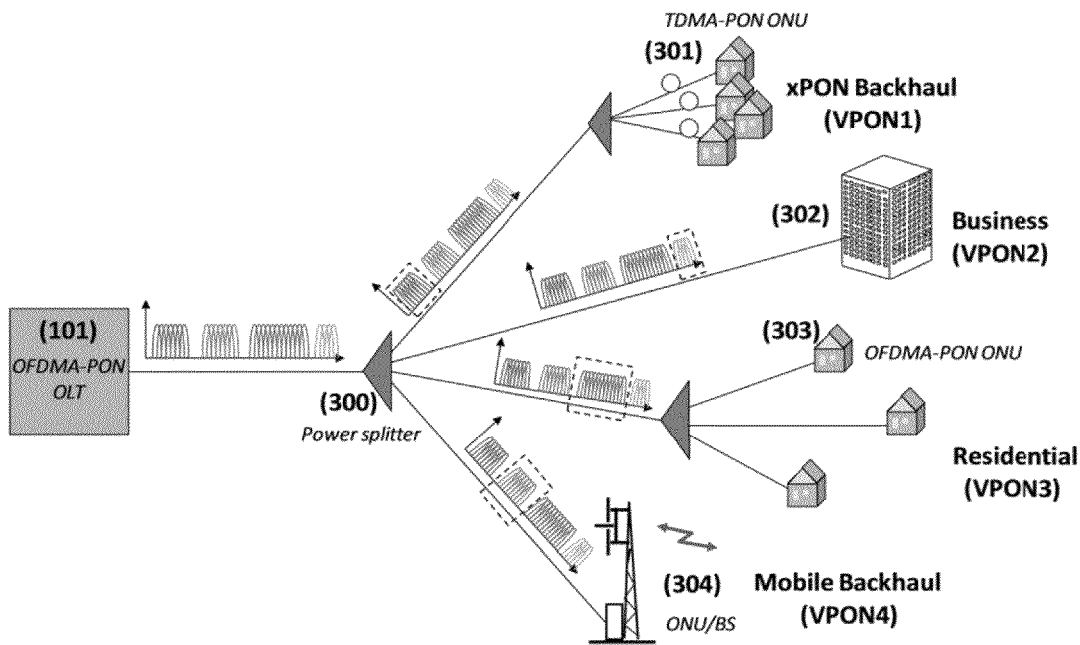
FIG. 1 shows an exemplary OFDMA-PON network supporting heterogeneous service, within which the invention is illustrated.

The present invention is directed to a novel OFDMA meta-MAC concept and implementation process for bridging the physical layer PHY divide and enabling efficient and fair bandwidth arbitration in future PON systems. Specifically, in the OFDMA-PON, shown in FIG. 1, the overall bandwidth is divided by the optical line terminal OLT (101) into orthogonal frequency-domain subcarriers, denoted by different colors in FIG. 1, and distributed over the fiber access infrastructure featuring a passive optical splitter (300). In this way, heterogeneous services, or "Virtual PONs" (VPONs), denoted by (301)-(304) in FIG. 1, can dynamically be assigned groups of subcarriers according to their real-time bandwidth demands. Since the individual subcarrier data rate is much lower than the aggregate rate, the requirement for fine bandwidth granularity is satisfied. However, a MAC-layer mechanism is nonetheless needed at the OFDMA-PON OLT (101) to fairly and accurately arbitrate the bandwidth resources among the VPONs. In previous work for broadcast networks subject to changing conditions, the concept of a "meta-MAC" protocol, which works on top of different component MACs with the same PHY layer and combines them into an optimized hybrid protocol, was introduced. However, in the absence of a common PHY, the meta-MAC problem is not one of hybrid optimization but of dynamic bandwidth arbitration. Consequently, in the present invention, the meta-MAC is a new protocol introduced at the OLT side (101) of an OFDMA-PON on top of the MAC modules that control the individual VPONs, such that they can coexist within the same infrastructure. The meta-MAC thus performs fair and efficient dynamic bandwidth arbitration among the VPONs.

Figure 2:
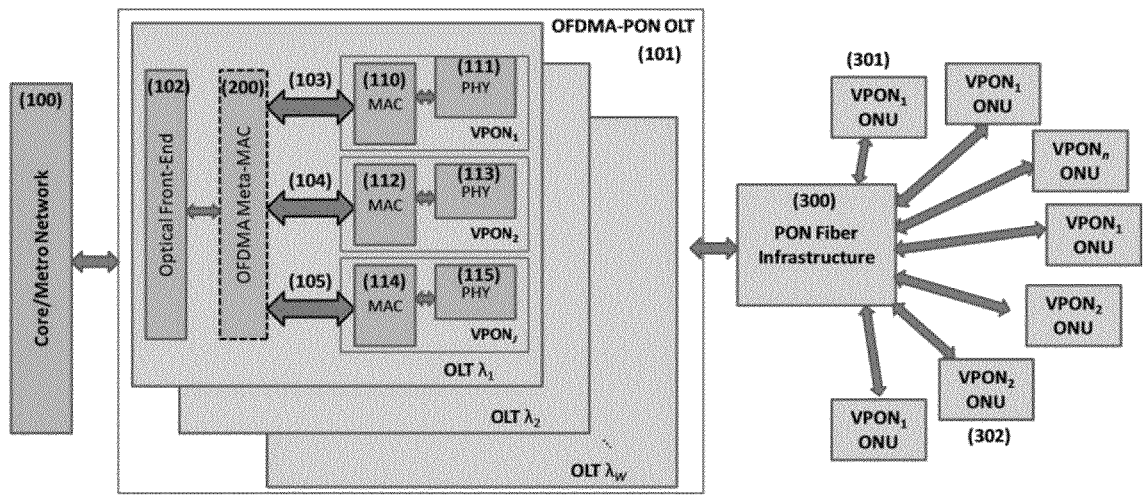
FIG. 2 is a diagram of the OFDMA meta configuration, in accordance with the invention.

In accordance with the invention, an orthogonal frequency division multiple access OFDMA meta-MAC architecture in the context of next-generation PON is shown in FIG. 2. As illustrated in FIG. 2, the optical front-end (102) of the OFDMA-PON OLT (101) interfaces to the core/metro network (100) as well as the OFDMA meta-MAC (200). The OFDMA meta-MAC (200) is implemented at the OLT (101) on top of the component MAC processes (110), (112), (114) of individual VPONs. The meta-MAC (200) exploits OFDMA subcarrier assignment to dynamically provision bandwidth resources according to the real-time needs of each VPON. Since each VPON is defined as an abstraction of a PHY traffic flow that is completely characterized by its bandwidth demands, the total number of OFDMA subcarriers and the per-subcarrier data are the only PHY-based variables needed by the meta-MAC. Based on those, the OFDMA meta-MAC assigns the available OFDMA subcarriers so as to generate a sufficiently broad PHY bandwidth pipe for each VPON, according to their individual bandwidth requirements. Therefore from the meta-MAC perspective, a VPON is simply an OFDMA subcarrier grouping. To communicate with the meta-MAC, the OLT-side constituent MACs of each VPON are equipped with new generic, PHY signaling interfaces (103), (104), (105) to the meta-MAC, which also enable translation between the meta-MAC schedule and the native MAC and PHY languages of each VPON (110)-(115). In this way, the MAC and PHY protocols adopted by the individual VPON ONUs can remain unchanged. Moreover, all wavelength channels $\lambda_1, \lambda_2, \ldots, \lambda_W$, can be optimized independently and transparently. The individual VPON MAC processes (110), (112), (114) next arbitrate their provisioned bandwidth among their ONUs (301), (302), etc. Depending on the native VPON PHY technology, this arbitration could be achieved using TDMA, OFDMA or other multiple access techniques. Finally, the native MAC layer information for each VPON is communicated to its ONUs over the fiber infrastructure (300), via the VPON PHY interfaces (111), (113), (115).

The broadest inventive feature of the proposed invention is the OFDMA meta-MAC (200) algorithm, shown in FIG. 2 in the context of a next-generation PON. The detailed inventive features of the OFDMA meta-MAC (200) are shown in FIG. 3. The meta-MAC first sends provisioning inquiries (201) to each individual VPON and waits for all VPONs to respond (202) before proceeding. The decision to perform bandwidth provisioning (203) for a given VPON is made if its real-time traffic fluctuations exceed a pre-defined threshold, which can be set either by the individual VPON MAC process or the meta-MAC. If bandwidth provisioning is needed, each participating VPON must provide its requirements to the meta-MAC (204), which consist of its guaranteed data rate $R_g^j$, peak rate $R_p^j$ and requested rate $R_{req}^j$. The relationship $R_g^j \leq R_{req}^j \leq R_p^j$ must always hold in the meta-MAC process. Denoting the individual subcarrier rates as C, the respective guaranteed, peak and requested numbers of subcarriers are given by: $S_g^j = \lceil R_g^j/C \rceil + S_{guard}$, $S_p^j = \lceil R_p^j/C \rceil + S_{guard}$ and $S_{req}^j = \lceil R_{req}^j/C \rceil + S_{guard}$ respectively. $S_{guard}$ denotes a sufficient number of unallocated subcarriers among neighboring VPONs used as a guardband to avoid unwanted interference.

The admitted VPONs that do not participate in the provisioning update maintain their subcarrier resources, while those participating in the provisioning round forfeit theirs. As a result, several groups of consecutive unallocated subcarriers are formed, which are referred to as voids. After all VPONs have responded (205), the meta-MAC identifies the location and width of those voids (210) since any admitted VPONs will receive bandwidth from this available subcarrier pool. The identification is performed based on information the Meta-MAC maintains regarding the subcarrier ranges assigned to each VPON at any given time, as well as on the overall subcarrier operating range for each wavelength.

Following void identification (210), the meta-MAC performs VPON admission (220); the detailed block diagram for (220) is shown in FIG. 4. First, the meta-MAC uses the inputs from (204) and (210) to formulate the VPON provisioning as a multiple knapsack optimization problem (221). The items of the knapsack problem correspond to the VPONs and their weights to the guaranteed number of subcarriers for each of them. The knapsacks are represented by the voids, with their capacity being equal to the void widths. Therefore the primary goal is to maximize the number of admitted VPONs, ensuring that they will be able to receive at least the guaranteed rate. The algorithm is formulated as follows: maximize: $\Sigma_{i=1}^{m}\Sigma_{j=1}^{n}x_{ij}$, subject to: $\Sigma_{j=1}^{n}S_g^j \cdot x_{ij} \leq S_i = 1, \ldots, n$, where the number of VPONs participating in the provisioning process is denoted by n, the number of spectral voids by m, while the number of subcarriers occupied by each void i is denoted by $S_i$. The binary variable $x_{ij}$ denotes if VPON j. is assigned to void i. ($x_{ij}=1$) or not ($x_{ij}=0$). Since a VPON will be assigned only a single group of consecutive subcarriers, it must hold that $\Sigma_{i=1}^{m}x_{ij} \leq 1$. Following the mathematical formulation, the problem is solved (222), such as, for example, using a recursive branch-and-bound algorithm [3], [4]. The exact choice of algorithm could depend on the estimated size of the problem (number of VPONs and number of voids) in a given deployment. It is noted that in this step more than one optimal solution may arise, and that the meta-MAC will continue searching the solution space until all optimal solutions have been found.

From among the set of optimal solutions, the meta-MAC will select the one that minimizes $\max_i H_i - \min_i H_i$, where $H_i = S_i - \Sigma_{j=1} S_{req}^j \cdot x_{ij}, i=1, \ldots, n$ (223). The purpose of this step is to ensure similar utilization levels for all voids after the requested numbers of subcarriers are taken into account, such that there is similar QoS performance for all admitted VPONs.

Following, VPON admission (220), the bandwidth assignment step (230) takes as input the admitted VPONs and their assigned voids, as determined in (220), and identifies the exact number of subcarriers to be allocated to each VPON. For VPON j' this is implemented by the following equation:

$$S_A^{j'} = S_g^{j'} + \frac{S_{req}^{j'} - S_g^{j'}}{\max(\Sigma_{j|x_{ij}=1}(S_{req}^j - S_g^j), S_i^u)} \cdot S_i^u,$$

where $S_i^u = S_i - \Sigma_{j|x_{ij}=1} S_g^j$ is the number of subcarriers available in void i. after all guaranteed rates have been satisfied. Therefore, all admitted VPONs will always receive at least the guaranteed number of subcarriers. Moreover, if there are sufficiently many left over subcarriers to accommodate requested rates of all admitted VPONs, then all VPONs in the void will receive their requested rate. Otherwise, they will receive an additional number of subcarriers that is proportional to the difference between their requested and guaranteed subcarrier numbers.

Next, the VPON spectrum allocation (240) step of the meta-MAC algorithm takes as input the outcomes of (220) and (230) and physically allocates a group of consecutive subcarriers for each admitted VPON. There are two main options for spectrum allocation in the case when there are still unallocated subcarriers in a void after bandwidth assignment (230) has been completed. The scattered option allows an additional number of subcarriers denoted as $$S_{extra}^{j'} = \frac{S_p^{j'} - S_A^{j'}}{\max(\Sigma_{j|x_{ij}=1}(S_p^j - S_A^j), S_i^{u'})} \cdot S_i^{u'}$$

to exist next to the group assigned to each VPON j', where $S_i^{u'} = S_i - \Sigma_{j|x_{ij}=1} S_A^j$. Although these subcarriers cannot be used by VPON j' in the adjacent provisioning round, it is possible for it to receive them in an upcoming round in order to satisfy its bandwidth demand without disrupting the spectrally neighboring VPONs. The compact approach, on the other hand, separates adjacent VPONs only by the pre-determined spectral guardband. The scattered option is recommended in the case of VPONs undergoing significant traffic fluctuations, while the compact approach is more suitable for VPONs requiring a fixed number of subcarriers. After the updated bandwidth provisioning schedule has been transmitted to the participating VPONs (250), the meta-MAC process pauses for a duration equal to the parameter $T_p$ (211) and then repeats from step (201). The exact value used for $T_p$ depends on whether dynamic bandwidth re-provisioning is intended to address fluctuations of ONU traffic or fluctuations in the number of ONUs, due to ONU registrations/de-registrations. In the former, the time scale of $T_p$ will be shorter compared to the latter case.

Figure 5:
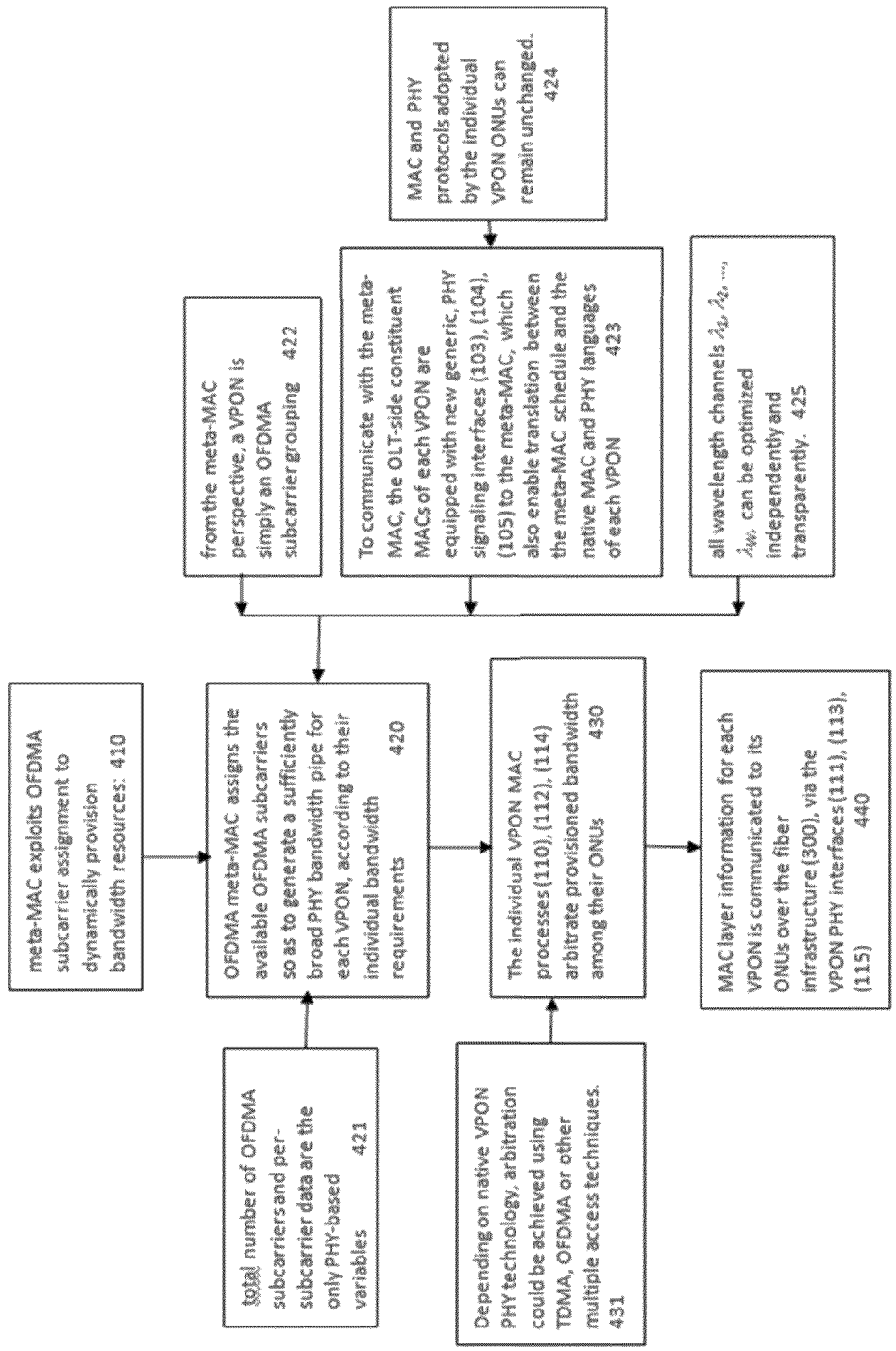
FIG. 5 shows a diagram of key aspects of the of the operation sequence of the meta-MAC process, in accordance with the invention.

Referring to FIG. 5, showing a diagram of operational aspects of the of the operation sequence of the meta-MAC process, in accordance with the invention. The meta-MAC exploits the OFDMA subcarrier assignment to dynamically provision bandwidth resources 410. The total number of OFDMA subcarriers and per-subcarrier data are the only PHY-based variables 421. The OFDMA meta-MAC assigns the available OFDMA subcarriers so as to generate a sufficiently broad PHY bandwidth pipe for each VPON, according to their individual bandwidth requirements 420. From the meta-MAC perspective, a VPON is simply an OFDMA subcarrier grouping 422. To communicate with the meta-Mac, the OLT-side constituent MACs of each VPON are equipped with new generic, PHY signaling interfaces (103), (104), (105) to the meta-MAC, which also enable translation between the meta-MAC schedule and the native MAC and PHY languages of each VPON 423. The MAC and PHY protocols adopted by the individual VPON ONUs can remain unchanged 424. All wavelength channels $\lambda_1, \lambda_2, \ldots, \lambda_W$ can be optimized independently and transparently 425.

The individual VPON MAC processes (110), (112), (114) arbitrate provisioned bandwidth among their ONUs 430. Depending on native VPON PHY technology, arbitration could be achieved using TDMA, OFDMA or other multiple access techniques 431. MAC layer information for each VPON is communicated to its ONUs over the fiber infrastructure (300), via the VPON PHY interfaces (111), (113), (115) 440.

From the foregoing, it can be appreciated that the present invention provides a novel mechanism for dynamic, finely granular bandwidth provisioning to multiple services and/or operators within a single wavelength, thus saving spectrum resources and increasing operator returns-on-investment. Moreover, the proposed dynamic and flexible provisioning scheme leverages statistical traffic multiplexing to support more users while also satisfying quality-of-service (QoS) requirements. The invention abstracts heterogeneous PHY parameters of various PON technologies, so as to enable cost-efficient mass market production of generic optical line terminal (OLT) interfaces.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. For example, those of ordinary skill in the art will recognize that multiple configurations for the optical processing path shown in FIG. 4 are possible to achieve the same signal transformation effect. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for multi-service provisioning in an OFDMA-PON, said method comprising the steps of:
    linking communicatively to a core network; and
    bandwidth provisioning, dynamically within a single wavelength, traffic from said core network to a network of multiple virtual passive optical networks VPONs for multi-service provisioning to said VPONs;
wherein said bandwidth provisioning comprises each participating VPON providing its requirements to a meta-MAC of its guaranteed data rate $R_g^j$, peak rate $R_p^j$ and requested rate $R_{reg}^j$, with a relationship $R_g^j \leq R_{reg}^j \leq R_p^j$ always holding in a meta-MAC process, and
wherein with individual subcarrier rates denoted as C, a respective guaranteed, peak and requested numbers of subcarriers are given by: $S_g^j = \lceil R_g^j/C \rceil + S_{guard}$, $S_p^j = \lceil R_p^j/C \rceil + S_{guard}$ and $S_{reg}^j = \lceil R_{reg}^j/C \rceil + S_{guard}$ respectively, where $S_{guard}$ denotes a sufficient number of unallocated subcarriers among neighboring VPONs used as a guardband to avoid unwanted interference.

2. The method of claim 1, wherein said bandwidth provisioning comprises:
    collecting VPON provisioning requirements and provisioning updates,
    performing said bandwidth provisioning for a given VPON if its real-time traffic fluctuations exceed a pre-defined threshold,
    setting said threshold either by an individual VPON MAC process or a meta-MAC,
    for needed bandwidth provisioning, each participating VPON providing its guaranteed rate, peak rate and requested rate to the meta-MAC.

3. The method of claim 2, wherein said bandwidth provisioning includes void identification comprising:
    admitted VPONs not participating in the bandwidth provisioning updating and maintaining their subcarrier resources, and
    VPONs participating in the bandwidth provisioning forfeiting their subcarriers, wherein multiple groups of consecutive unallocated subcarriers being formed and referred to as voids wherein after all VPONs have responded the meta-MAC identifies locations and widths of those voids since any admitted VPONs will receive bandwidth from this available subcarrier pool, the void identification being performed based on information the Meta-MAC maintains regarding the subcarrier ranges assigned to each VPON at any given time, as well as on the overall subcarrier operating range for each wavelength.

4. The method of claim 2, wherein said bandwidth provisioning includes
VPON admission comprising:
formulating provisioning as a multiple knapsack problem where items of the knapsack problem correspond to VPONs and their weights to the guaranteed number of subcarriers for each of them and said knapsacks being represented by voids with their capacity being equal to the void widths,
finding all optimal solutions of the knapsack problem; and
selecting solutions, from the prior finding of all optimal solutions, that maximize void utilization.

5. The method of claim 4, wherein said maximize void utilization comprises maximizing number of admitted VPONs, ensuring that they will be able to receive at least the guaranteed rate based on the relationship maximize: $\Sigma_{i=1}^{m}\Sigma_{j=1}^{n}x_{ij}$, subject to: $\Sigma_{j=1}^{n=1} S_g^j \cdot x_{ij} \leq S_i$, i=1, ..., n, where the number of VPONs participating in the provisioning process is denoted by n, the number of spectral voids by m, while the number of subcarriers occupied by each void i is denoted by $S_i$ and the binary variable $x_{ij}$ denoting if VPON j is assigned to void i ($x_{ij=1}$) or not ($x_{ij}=0$).

6. The method of claim 4, wherein said selecting solutions, from the prior finding of all optimal solutions, comprises the meta-MAC selecting the one that minimizes $\max_i H_i - \min_i H_i$, where $H_i = S_i - \Sigma_{j=1}^{n} S_{req}^j \cdot x_{ij}$, i=1, ..., n (223) for ensuring similar utilization levels for all voids after the requested numbers of subcarriers are taken into account, such that there is similar QoS performance for all admitted VPONs, where the number of VPONs participating in the provisioning process is denoted by n, while the number of subcarriers occupied by each void i is denoted by $S_i$ and the binary variable $x_{ij}$ denoting if VPON j is assigned to void i ($x_{ij}=1$) or not ($x_{ij}=0$).

7. The method of claim 1, wherein said bandwidth provisioning includes a void assignment comprising taking as input admitted VPONs and their assigned voids and identifying exact number of subcarriers to be allocated to each VPON.

8. The method of claim 7, wherein said void assignment comprises an implementation based on the relationship:

$$S_A^{j'} = S_g^{j'} + \frac{S_{req}^{j'} - S_g^{j'}}{\max(\Sigma_{j|x_{ij}=1}(S_{req}^j - S_g^j), S_i^u)} \cdot S_i^u,$$

where $S_i^u = S_i - \Sigma_{j|x_{ij}=1} S_g^j$ is the number of subcarriers available in void i after all guaranteed rates have been satisfied.

9. The method of claim 1, wherein said bandwidth provisioning comprises all admitted VPONs always receiving at least a guaranteed number of subcarriers, if there are sufficiently many left over subcarriers to accommodate requested rates of all admitted VPONs then all VPONs in the void will receive their requested rate, otherwise all VPONs in the void will receive an additional number of subcarriers that is proportional to the difference between their requested and guaranteed subcarrier numbers.

10. The method of claim 1, wherein said bandwidth provisioning includes a VPON spectrum allocation comprising physically allocating a group of consecutive subcarriers for each admitted VPON, said spectrum allocation in case when there are still unallocated subcarriers in a void after a bandwidth assignment has been completed being one of a scattered approach and a compact approach, said scattered approach being suited for case of VPONs undergoing traffic fluctuations, while the compact approach being suited for VPONs requiring a fixed number of subcarriers.

11. The method of claim 10, wherein said scattered approach comprises allows an additional number of subcarriers denoted as $$S_{extra}^{j'} = \frac{S_p^{j'} - s_A^{j'}}{\max(\Sigma_{j|x_{ij}=1}(S_p^j - S_A^j), S_i^{u'})} \cdot S_i^{u'}$$

to exist next to a group assigned to each VPON j', where $S_i^{u'} = S_i - \Sigma_{j|x_{ij}=1} S_A^j$, while these subcarriers are not useable by VPON j' in an adjacent provisioning round, it is possible for VPON j' to receive them in an upcoming round in order to satisfy its bandwidth demand without disrupting spectrally neighboring VPONs.

12. The method of claim 1, wherein said bandwidth provisioning comprises a meta-Mac for exploiting OFDMA subcarrier assignment to dynamically provision bandwidth resources.

13. The method of claim 12, wherein said OFDMA meta-MAC assigns available subcarriers so as to generate a broad PHY bandwidth pipe for each VPON according to its individual bandwidth requirements.

14. The method of claim 12, wherein a total number of OFDMA subcarriers and per subcarrier data are the only PHY-based data.

15. The method of claim 12, wherein from a meta-mac perspective, a VPON is simply an OFDMA subcarrier grouping.

16. The method of claim 12, wherein to communicate with the meta-MAC, optical line terminal OLT-side constituent MACs of each VPON being equipped with generic, PHY signaling interfaces to the meta-MAC, which also enables translation between a meta-MAC Schedule and native MAC and PHY languages.

17. The method of claim 12, wherein individual VPON MAC processes arbitrate provisioned bandwidth among their optical network units ONUs.

18. The method of claim 7, wherein MAC layer information for each VPON being communicated to its ONUs over a fiber infrastructure via PHY interfaces.

19. A method for multi-service provisioning in an OFDMA-PON, said method comprising the steps of:
linking communicatively to a core network; and
bandwidth provisioning, dynamically within a single wavelength, traffic from said core network to a network of multiple virtual passive optical networks VPONs for multi-service provisioning to said VPONs;
wherein said bandwidth provisioning comprises:
collecting VPON provisioning requirements and provisioning updates,
performing said bandwidth provisioning for a given VPON if its real-time traffic fluctuations exceed a pre-defined threshold,
setting said threshold either by an individual VPON MAC process or a meta-MAC, for needed bandwidth provisioning, each participating VPON providing its guaranteed rate,
peak rate and requested rate to the meta-MAC;
said bandwidth provisioning including VPON admission comprising:
formulating provisioning as a multiple knapsack problem where items of the knapsack problem correspond to VPONs and their weights to the guaranteed number of subcarriers for each of them and said knapsacks being represented by voids with their capacity being equal to the void widths,
finding all optimal solutions of the knapsack problem; and
selecting solutions, from the prior finding of all optimal solutions, that maximize void utilization; and
said maximize void utilization comprising maximizing number of admitted VPONs, ensuring that they will be able to receive at least the guaranteed rate based on the relationship maximize: $\Sigma_{i=1}^{m}\Sigma_{j=1}^{n} x_{ij}$, subject to: $\Sigma_{j=1}^{n} S_g^j \cdot x_{ij} \leq S_i$, $i=1,\ldots,n$, where the number of VPONs participating in the provisioning process is denoted by n, the number of spectral voids by m, while the number of subcarriers occupied by each void i is denoted by $S_i$ and the binary variable $x_{ij}$ denoting if VPON j is assigned to void i ($x_{ij}=1$) or not ($x_{ij}=0$).

20. A method for multi-service provisioning in an OFDMA-PON, said method comprising the steps of:
linking communicatively to a core network; and
bandwidth provisioning, dynamically within a single wavelength, traffic from said core network to a network of multiple virtual passive optical networks VPONs for multi-service provisioning to said VPONs;
wherein said bandwidth provisioning includes a void assignment comprising taking as input admitted VPONs and their assigned voids and identifying exact number of subcarriers to be allocated to each VPON; and
wherein said void assignment comprises an implementation based on the relationship:

$$S_A^{j'} = S_g^{j'} + \frac{S_{req}^{j'} - S_g^{j'}}{\max\left(\Sigma_{j|x_{ij}=1}(S_{req}^j - S_g^j), S_i^u\right)} \cdot S_i^u,$$

where $S_i^u = S_i - \Sigma_{j|x_{ij}=1} S_g^j$ is the number of subcarriers available in void i after all guaranteed rates have been satisfied.

* * * * *